(12) United States Patent
Mehring

(10) Patent No.: US 8,068,012 B2
(45) Date of Patent: Nov. 29, 2011

(54) RFID DEVICE AND SYSTEM FOR SETTING A LEVEL ON AN ELECTRONIC DEVICE

(75) Inventor: Peter Arnold Mehring, Los Altos, CA (US)

(73) Assignee: Intelleflex Corporation, Santa Clara, CA (US)

( * ) Notice: Subject to any disclaimer, the term of this patent is extended or adjusted under 35 U.S.C. 154(b) by 408 days.

(21) Appl. No.: 12/350,744

(22) Filed: Jan. 8, 2009

(65) Prior Publication Data
US 2010/0171598 A1  Jul. 8, 2010

(51) Int. Cl.
*H04Q 5/22* (2006.01)

(52) U.S. Cl. .................. 340/10.5; 340/12.51; 340/13.26

(58) Field of Classification Search .................. 340/10.1, 340/10.5, 572.1, 660, 664, 12.51, 13.26; 307/130, 131
See application file for complete search history.

(56) References Cited

U.S. PATENT DOCUMENTS

| | | | |
|---|---|---|---|
| 5,710,421 A | 1/1998 | Kokubu | 235/492 |
| 5,719,586 A | 2/1998 | Tuttle | 343/726 |
| 5,874,902 A | 2/1999 | Heinrich et al. | 340/825.54 |
| 5,887,171 A | 3/1999 | Tada et al. | 395/683 |
| 5,999,939 A | 12/1999 | de Hilster et al. | 707/102 |
| 6,014,680 A | 1/2000 | Sato et al. | 707/513 |
| 6,061,614 A | 5/2000 | Carrender et al. | 701/33 |
| 6,078,924 A | 6/2000 | Ainsbury et al. | 707/101 |
| 6,104,281 A | 8/2000 | Heinrich et al. | 340/10.5 |
| 6,161,107 A | 12/2000 | Stern | 707/104 |
| 6,169,377 B1 * | 1/2001 | Bryde et al. | 315/294 |
| 6,278,413 B1 | 8/2001 | Hugh et al. | 343/818 |
| 6,338,056 B1 | 1/2002 | Dessloch et al. | 707/2 |
| 6,392,544 B1 | 5/2002 | Collins et al. | 340/572.7 |
| 6,424,029 B1 | 7/2002 | Giesler | 257/679 |
| 6,424,980 B1 | 7/2002 | Iizuka et al. | 707/513 |
| 6,588,660 B1 | 7/2003 | Buescher et al. | 235/382 |
| 6,604,099 B1 | 8/2003 | Chung et al. | 707/3 |
| 6,697,818 B2 | 2/2004 | Li et al. | 707/103 |
| 5,999,939 C1 | 10/2004 | de Hilster et al. | 707/102 |
| 6,816,063 B2 | 11/2004 | Kubler et al. | 340/10.33 |
| 6,830,193 B2 | 12/2004 | Tanaka | 235/492 |
| 6,968,338 B1 | 11/2005 | Gawdiak et al. | 707/100 |
| 7,042,413 B2 | 5/2006 | Mazoki et al. | 343/795 |
| 7,100,835 B2 | 9/2006 | Selker | 235/492 |
| 7,138,928 B2 * | 11/2006 | Dischert | 340/12.3 |
| 7,139,752 B2 | 11/2006 | Broder et al. | 707/4 |
| 7,143,091 B2 | 11/2006 | Charnock et al. | 707/5 |
| 7,154,449 B2 | 12/2006 | Liu et al. | 343/867 |
| 7,156,301 B1 | 1/2007 | Bonalle et al. | 235/380 |
| 7,180,403 B2 | 2/2007 | Quan | 340/10.3 |
| 2002/0067267 A1 | 6/2002 | Kirkham | 340/572.7 |
| 2002/0113709 A1 | 8/2002 | Helms | 340/572.7 |
| 2002/0156817 A1 | 10/2002 | Lemus | 707/531 |
| 2002/0184188 A1 | 12/2002 | Mandyam et al. | 707/1 |
| 2003/0095034 A1 * | 5/2003 | Clothier | 340/10.1 |
| 2004/0070491 A1 | 4/2004 | Huang et al. | 340/10.5 |

(Continued)

*Primary Examiner* — Thomas Mullen
(74) *Attorney, Agent, or Firm* — Zilka-Kotab, PC

(57) ABSTRACT

A system in one embodiment includes an electronic device; and a Radio Frequency Identification (RFID) device in direct electrical communication with the electronic device for selectively setting a voltage or current on the electronic device to one of at least three different levels. A Radio Frequency Identification (RFID) device in another embodiment includes an antenna; a processor in communication with the antenna; and an interface in communication with the processor, the interface being adapted for direct electrical communication with an electronic device for selectively setting a voltage or current on the electronic device to one of at least three different levels. Additional systems and methods are also presented.

34 Claims, 4 Drawing Sheets

U.S. PATENT DOCUMENTS

| | | | |
|---|---|---|---|
| 2004/0124248 A1 | 7/2004 | Selker | 235/492 |
| 2004/0128615 A1 | 7/2004 | Carmel et al. | 715/513 |
| 2004/0164864 A1 | 8/2004 | Chung et al. | 340/572.7 |
| 2004/0183742 A1 | 9/2004 | Goff et al. | 343/867 |
| 2004/0263319 A1 | 12/2004 | Huomo | 340/10.2 |
| 2005/0231367 A1 | 10/2005 | Bellantoni | 340/572.1 |
| 2005/0237184 A1 | 10/2005 | Muirhead | 340/539.13 |
| 2005/0280504 A1 | 12/2005 | Pettus | 340/10.1 |
| 2006/0015482 A1 | 1/2006 | Beyer et al. | 707/3 |
| 2006/0033609 A1 | 2/2006 | Bridgelall | 340/10.42 |
| 2006/0043199 A1 | 3/2006 | Baba et al. | 235/492 |
| 2006/0065740 A1 | 3/2006 | Lyons et al. | 235/492 |
| 2006/0071790 A1 | 4/2006 | Duron et al. | 340/572.1 |
| 2006/0082458 A1 | 4/2006 | Shanks et al. | 340/572.4 |
| 2006/0114102 A1 | 6/2006 | Chang et al. | 340/10.1 |
| 2006/0145863 A1 | 7/2006 | Martin et al. | 340/572.8 |
| 2006/0145868 A1 | 7/2006 | Chen et al. | 340/572.8 |
| 2006/0152337 A1 | 7/2006 | Hsu | 340/5.5 |
| 2006/0187046 A1 | 8/2006 | Kramer | 340/572.3 |
| 2006/0192018 A1 | 8/2006 | Tsai et al. | 235/492 |
| 2006/0202821 A1 | 9/2006 | Cohen | 340/539.27 |
| 2006/0208853 A1 | 9/2006 | Kung et al. | 340/5.61 |
| 2006/0232419 A1 | 10/2006 | Tomioka et al. | 340/572.7 |
| 2006/0232437 A1 | 10/2006 | Gutowski et al. | 340/825.69 |
| 2006/0237537 A1 | 10/2006 | Empedocles et al. | 235/439 |
| 2006/0244598 A1 | 11/2006 | Hyde et al. | 340/572.1 |
| 2006/0267731 A1 | 11/2006 | Chen | 340/10.1 |
| 2006/0267734 A1 | 11/2006 | Taki et al. | 340/10.4 |
| 2006/0274857 A1 | 12/2006 | Chiu | 375/316 |
| 2006/0279412 A1 | 12/2006 | Holland et al. | 340/10.51 |
| 2006/0279458 A1 | 12/2006 | Mohamadi | 342/368 |
| 2006/0288275 A1 | 12/2006 | Chidlovskii et al. | 715/513 |
| 2006/0289657 A1 | 12/2006 | Rosenberg | 235/492 |
| 2007/0001811 A1 | 1/2007 | Kiyohara | 340/10.1 |
| 2007/0001856 A1 | 1/2007 | Diorio et al. | 340/572.1 |
| 2007/0001862 A1 | 1/2007 | Zweig | 340/588 |
| 2007/0013517 A1 | 1/2007 | Posamentier | 340/572.1 |
| 2007/0018832 A1 | 1/2007 | Beigel et al. | 340/572.7 |
| 2007/0021074 A1 | 1/2007 | Posamentier | 455/91 |
| 2007/0024463 A1 | 2/2007 | Hall et al. | 340/825.69 |
| 2007/0027459 A1 | 2/2007 | Horvath et al. | 606/147 |
| 2007/0035382 A1 | 2/2007 | Lee et al. | 340/10.1 |
| 2007/0038586 A1 | 2/2007 | Vaucois | 706/14 |
| 2007/0046369 A1 | 3/2007 | Schober et al. | 330/7 |
| 2007/0046430 A1 | 3/2007 | Yamazaki et al. | 340/10.1 |
| 2007/0075862 A1* | 4/2007 | Hunt et al. | 340/572.1 |

* cited by examiner

US 8,068,012 B2

RFID DEVICE AND SYSTEM FOR SETTING A LEVEL ON AN ELECTRONIC DEVICE

FIELD OF THE INVENTION

The present invention relates to Radio Frequency Identification (RFID) systems, and more particularly, this invention relates to RFID devices and systems for setting a level on an electronic device.

BACKGROUND OF THE INVENTION

The use of RFID tags are quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag reader. This coupling is advantageous, as it precludes the need for a direct contact or line of sight connection between the tag and the reader.

SUMMARY OF THE INVENTION

A system in one embodiment includes an electronic device; and a Radio Frequency Identification (RFID) device in direct electrical communication with the electronic device for selectively setting a voltage or current on the electronic device to one of at least three different levels.

An RFID device in another embodiment includes an antenna; a processor in communication with the antenna; and an interface in communication with the processor, the interface being adapted for direct electrical communication with an electronic device for selectively setting a voltage or current on the electronic device to one of at least three different levels.

A method for setting at least one of a voltage and a current level on an electronic device in one embodiment includes receiving, via an air interface, instructions to set one of at least three different voltage or current levels on an electronic device; in response to the instructions, outputting an electrical signal to the electronic device for setting the voltage or current level on the electronic device.

A method for setting at least one of a voltage and a current level on an electronic device based on one or more sensor readings according to another embodiment includes receiving one or more sensor values; selecting one of at least three different voltage or current levels to set on an electronic device based on the one or more sensor values; and using an RFID device, causing the voltage or current level on the electronic device to be set at the selected level.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
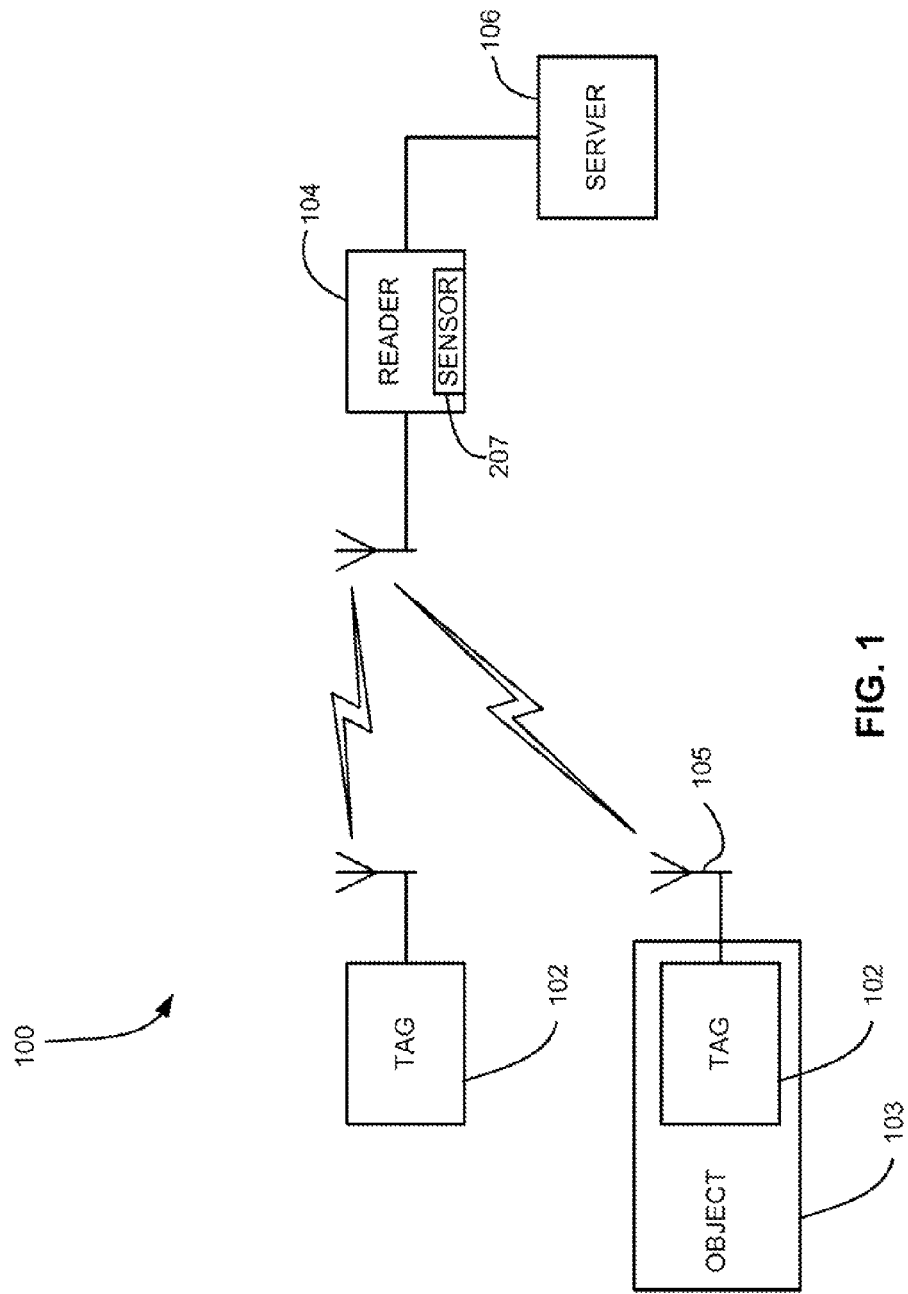
FIG. 1 is a system diagram of an RFID system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In the drawings, like and equivalent elements are numbered the same throughout the various figures.

FIG. 1 depicts a general RFID system 100 according to one embodiment, which may include some or all of the following components and/or other components. As shown in FIG. 1, one or more RFID devices 102 are present. Each RFID device 102 in this embodiment includes a controller and memory, which are preferably embodied on a single chip as described below, but may also or alternatively include a different type of controller, such as an application specific integrated circuit (ASIC), processor, an external memory module, etc. For purposes of the present discussion, the RFID devices 102 will be described as including a chip. Each RFID device 102 may further include or be coupled to an antenna 105.

An illustrative chip is disclosed below, though actual implementations may vary depending on how the device is to be used. In general terms, a preferred chip includes one or more of a power supply circuit to extract and regulate power from the RF reader signal; a detector to decode signals from the reader; a backscatter modulator, a transmitter to send data back to the reader; anti-collision protocol circuits; and at least enough memory to store its unique identification code, e.g., Electronic Product Code (EPC).

While RFID devices 102 according to some embodiments are functional RFID tags, other types of RFID devices 102 include merely a controller with on-board memory, a controller and external memory, etc.

One or more of the RFID devices 102 may be coupled to an object 103, such as an article of manufacture, an electronic device, a container, a device, a person, etc.

With continued reference to FIG. 1, a remote device 104 such as an interrogator or "reader" communicates with the RFID devices 102 via an air interface, preferably using standard RFID protocols. An "air interface" refers to any type of wireless communications mechanism, such as the radio-frequency signal between the RFID device and the remote device. The RFID device 102 executes the computer commands that the RFID device 102 receives from the reader 104.

The system 100 may also include an optional backend system such as a server 106, which may include databases containing information and/or instructions relating to RFID tags and/or tagged items.

As noted above, each RFID device 102 may be associated with a unique identifier. Such identifier is preferably an EPC code. The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each RFID device 102 may also store information about the item to which it is coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

RFID systems may use reflected or "backscattered" radio frequency (RF) waves to transmit information from the RFID device 102 to the remote device 104, e.g., reader. Since passive (Class-1 and Class-2) tags get all of their power from the reader signal, the tags are only powered when in the beam of the reader 104.

The Auto ID Center EPC-Compliant tag classes are set forth below:

Class-1
Identity tags (RF user programmable, range ~3 m)
Lowest cost
Class-2
Memory tags (20 bit address space programmable at ~3 m range)
Security & privacy protection
Low cost
Class-3
Semi-passive tags (also called semi-active tags and battery assisted passive (BAP) tags)
Battery tags (256 bits to 2M words)
Self-Powered Backscatter (internal clock, sensor interface support)
~100 meter range
Moderate cost
Class-4
Active tags Active transmission (permits tag-speaks-first operating modes)
~300 to 1,000 meter range
Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (e.g., semi-active, semi-passive or battery-assisted), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond, at a shorter distance up to 3 meters.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds.

A basic RFID communication between an RFID device and a remote device typically begins with the remote device, e.g., reader, sending out signals via radio wave to find a particular RFID device, e.g., tag via singulation or any other method known in the art. The radio wave hits the RFID device, and the RFID device recognizes the remote device's signal and may respond thereto. Such response may include exiting a hibernation state, sending a reply, storing data, etc.

Figure 2:
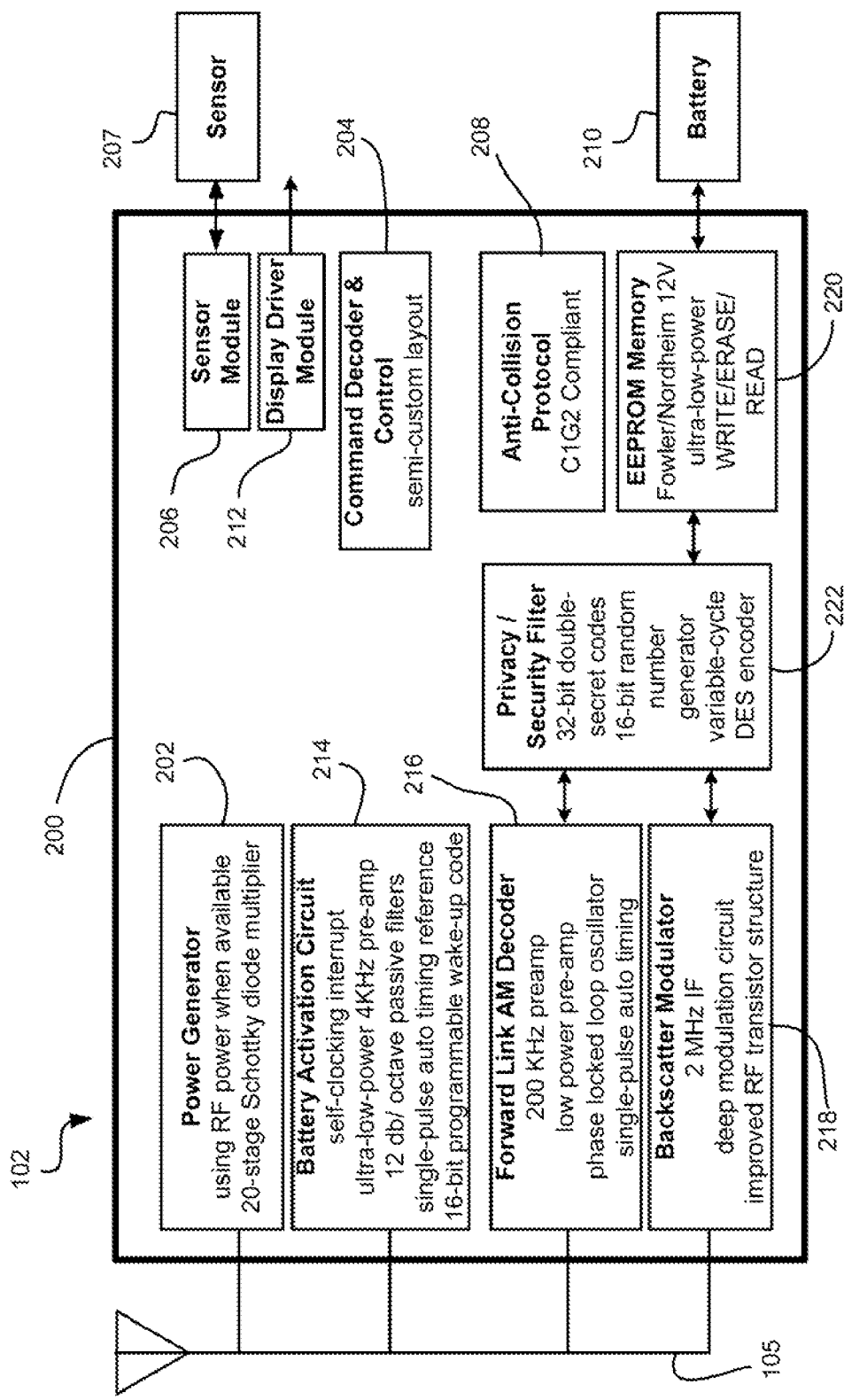
FIG. 2 is a system diagram for an integrated circuit (IC) chip for implementation in an RFID device.

Embodiments of the RFID device are preferably implemented in conjunction with a Class-3 or higher Class IC chip, which typically contains the processing and control circuitry for most if not all tag operations. FIG. 2 depicts a circuit layout of a Class-3 IC 200 and the various control circuitry according to an illustrative embodiment for implementation in an RFID device 102. It should be kept in mind that the present invention can be implemented using any type of RFID device, and the circuit 200 is presented as only one possible implementation.

The Class-3 IC of FIG. 2 can form the core of RFID chips appropriate for many applications such as identification of pallets, cartons, containers, vehicles, or anything where a range of more than 2-3 meters is desired. As shown, the chip 200 includes several circuits including a power generation and regulation circuit 202, a digital command decoder and control circuit 204, a sensor interface module 206, an optional sensor 207 coupled to the sensor interface module and on the RFID device, a C1G2 interface protocol circuit 208, a power source (battery) 210 and a battery activation circuit 214. A display driver module 212 can be added to drive a display.

A forward link AM decoder 216 uses a simplified phase-lock-loop oscillator that requires only a small amount of chip area. Preferably, the circuit 216 requires only a minimum string of reference pulses.

A backscatter modulator block 218 preferably increases the backscatter modulation depth to more than 50%.

A memory cell, e.g., EEPROM, is also present. In one approach, the memory cell preferably has a capacity from several kilobytes to one megabyte or more. In one embodiment, a pure, Fowler-Nordheim direct-tunneling-through-oxide mechanism 220 is present to reduce both the WRITE and ERASE currents to about 2 μA/cell in the EEPROM memory array. This permits reliable tag operation at maximum range even when WRITE and ERASE operations are being performed. In other embodiments, the WRITE and ERASE currents may be higher or lower, depending on the type of memory used and its requirements.

Preferably, the amount of memory available on the chip or otherwise is adequate to store data such that the external device need not be in active communication with the remote device.

The module 200 may also incorporate a security encryption circuit 222 for operating under one or more security schemes, secret handshakes with readers, etc.

The RFID device may have a dedicated power supply, e.g. battery; may draw power from a power source of an electronic device to which coupled (e.g., its battery, AC adapter, etc.); or both. Further, the RFID device may include a supplemental power source, e.g., one that captures energy from outside the tag, be it from solar, RF, kinetic, etc. energy. Note that while the present description refers to a "supplemental" power source, the supplemental power source may indeed be the sole device that captures energy for operation of the tag, e.g., as some passive RFID tags extract energy from the reader signal as their sole means of power.

Figure 3A:
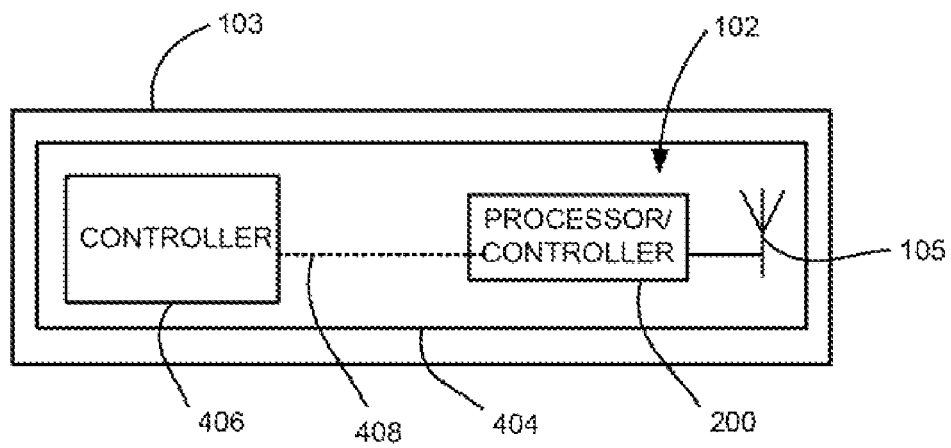
FIG. 3A is a system diagram of an electronic device in which a controller, e.g., chip, of an RFID device is located on a same printed circuit board as a controller of the electronic device.
Figure 3B:
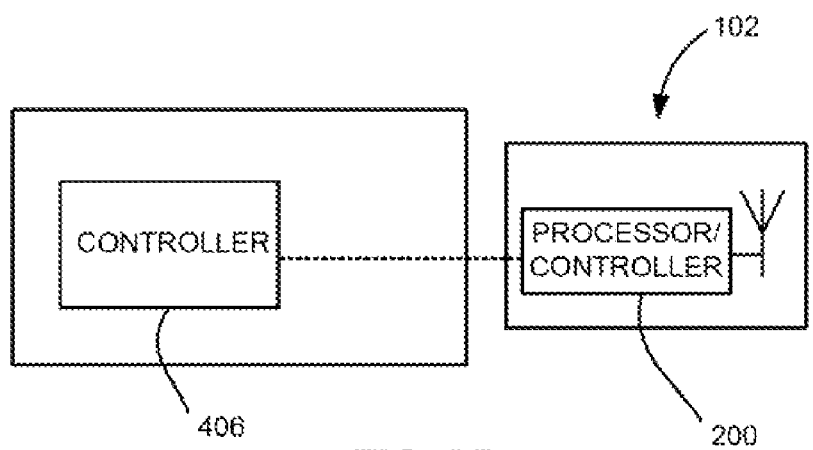
FIG. 3B is a system diagram of an electronic device and an RFID device external thereto.
Figure 3C:
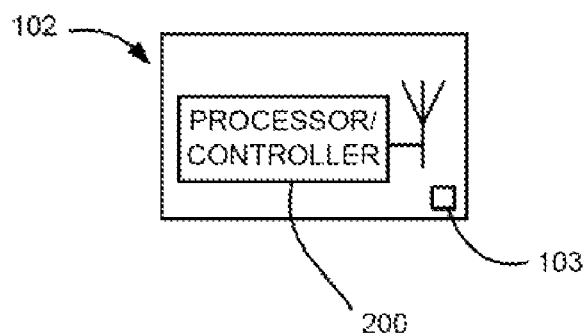
FIG. 3C is a system diagram of an RFID device having an electronic device coupled thereto.

In one general embodiment, shown generally with reference to FIGS. 3A-C, a system according to one embodiment includes an electronic device 103 and an RFID device 102 in direct electrical communication with the electronic device 103 for selectively setting a voltage or current on the electronic device 103 to one of at least three different levels. Note that setting a voltage level, current level, etc. as used herein includes an initial setting of the voltage level, current level, etc. as well as a changing thereof to another voltage level, current level, etc.

The RFID device 102 may be any type of RFID device, including those described herein. An illustrative RFID device 102, shown generally in FIG. 3A, comprises an antenna 105, a processor 200 in communication with the antenna 105, and an interface 408 in communication with the processor 200, the interface 408 being adapted for direct electrical communication with the electronic device 103 for selectively setting a voltage or current on the electronic device 103 to one of at least three different levels.

The electronic device 103 may be any device whose operation or functionality is modifiable and/or dependent upon a voltage or current level. Thus, the electronic device 103 may be any type of electronic device, from something very simple like a Light Emitting Diode (LED) driven directly by the output of the RFID device 102, to more complex devices that might include moving parts.

In various embodiments, the electronic device 103 emits an audible output, a visual output, or both. Such an embodiment may include a light (e.g., an LED, OLED, incandescent, etc.) and/or an electronic chime or alarm, mechanical bell, etc. A state of the audible and/or visual output is determined by the voltage or current level set on the electronic device 103. In an audible output embodiment, the tone and/or intensity may vary depending on the setting. In a visual output, the intensity and/or color of the light emitted may vary depending on the setting.

In other embodiments, the electronic device 103 includes or controls an electric motor, where a state of the electric motor (e.g., on, off, constant speed setting, variable speed, etc.) is determined by the voltage or current level set on the electronic device.

In another embodiment, the level set on the electronic device is based at least in part on one or more sensor readings. An illustrative embodiment using sensor readings is set forth below.

In one approach, the RFID device 102 sets the voltage or current on the electronic device 103 to one of at least three different levels. The levels generally result in the device or something controlled by the device achieving a certain state, e.g., a fully functional state, a nonfunctional state, a partially functional state, etc.; and/or the voltage or current level may control an operation of the electronic device.

As alluded to above, one embodiment may have only three levels. Other embodiments may have more levels, e.g., 4, 5, 6, 7, 8, or 9 levels. The number of levels that may be set can be very large. For example, one embodiment contemplates the ability to set 10 or more levels, while other embodiments contemplate the ability to set 25 or more, 50 or more and 100 or more levels.

Illustrative levels include a "full on" and/or a "full off" setting. Levels may also include something in between, such as an incremental level. Examples include a fan that is set to one of five speeds depending on the set level, e.g., off or at some progressively faster speed arbitrarily numbered 1-4 for this example. In other embodiments, the levels may cause the electronic device 103 to perform unrelated functions or act in unrelated ways. For instance, one level may cause the electronic device 103 to turn on a heating unit, while another level may cause the electronic device 103 to turn on a cooling unit.

The direct electrical communication between the RFID device 102 and electronic device 103 can be any type of physical connection, and may allow bidirectional communication, but does not in simpler embodiments. Illustrative direct physical connections include one or more wires coupling the devices, a plug and socket arrangement, connections on a common printed circuit board, etc.

In some embodiments, the RFID device 102 is not mounted to the electronic device 103. In other embodiments, the RFID device 102 is permanently or detachably mounted on the electronic device 103. In another aspect, the RFID device 102 is physically integrated with the electronic device 103. For example, FIG. 3A depicts an embodiment where the controller 200, e.g., chip, of the RFID device 102 is located on a same printed circuit board 404 as a controller 406 of the electronic device 103. In another example, the RFID device 102 may be positioned within a housing of the electronic device 103. FIG. 3B illustrates an embodiment where the RFID device 102 is external to the electronic device 103. FIG. 3C illustrates an embodiment where the electronic device 103 is part of the RFID device 102.

The actual signal sent by the RFID device 102 to the electronic device 103 may take any suitable form. In one approach, an analog signal is used to communicate the level setting from the RFID device to the electronic device. In one approach, different voltage levels are used to communicate the desired setting to the electronic device 103. In another approach, different current levels are used to communicate the desired setting to the electronic device 103. Those skilled in the art will appreciate the many ways to create such an output. For example, a Digital to Analog Converter (DAC) may be used to output a selected voltage (or current) level to the electronic device 103. During use, the RFID device 102, acting at the request of an RFID reader, another device, or of its own accord, may retrieve a digital code from memory, where the digital code corresponds to a predetermined voltage level. The digital code is transmitted to the DAC, which converts the code to a voltage output at a level corresponding to the code. The electronic device 103 may simply operate using the voltage or current output from the RFID device 102, as in an embodiment where the electronic device 103 is an LED. In other embodiments, the electronic device 103 includes appropriate decoding or level-setting logic, firmware or software that is responsive to the incoming analog signal.

In another approach, Pulse Width Modulation (PWM) or frequency modulation is used to communicate the level setting from the RFID device to the electronic device. Those skilled in the art will appreciate the many ways to create such an output. For example, the controller 200 may directly generate the PWM signal. In other approaches, simple logic may be used to generate the PWM signal. Any generation technique may be used, including the aforementioned digital generation, as well as intersective, delta, sigma-delta, etc. During use, the RFID device 102, acting at the request of an RFID reader, another device, or of its own accord, generates a PWM signal, where the signal correlates to a predetermined voltage level setting on the electronic device 103. The electronic device 103 may simply operate using the output from the RFID device 102, as in an embodiment where the electronic device 103 is an LED. PWM is particularly preferred in such embodiments, as PWM tends to be very energy efficient. In other embodiments, the electronic device 103 includes appropriate decoding or level-setting logic, firmware or software that is responsive to the incoming PWM signal.

Further, the signal that communicates the setting from the RFID device to the electronic device may persist beyond the duration of the RFID command that instructs the RFID device to apply the setting. In another approach, the signal that communicates the setting from the RFID device to the electronic device may persist even in the absence of RF energy sufficient to power the RFID device or portion thereof. In such approaches, battery assistance, capacitor assistance, etc. may be used.

Figure 4:
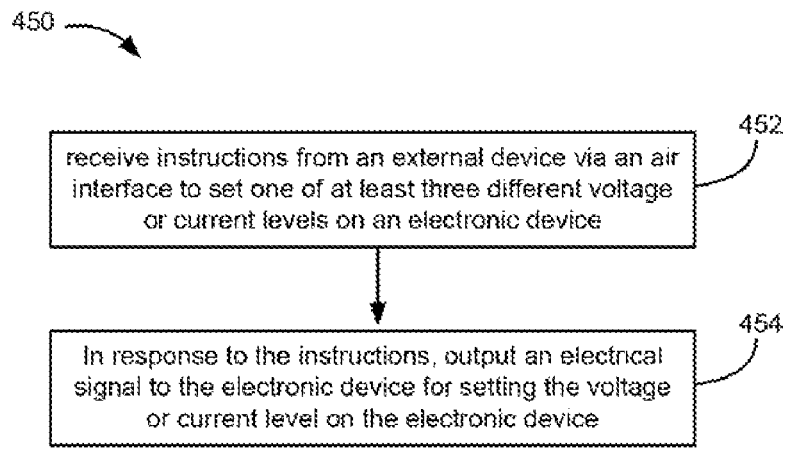
FIG. 4 is a process diagram depicting a method for setting at least one of a voltage and a current level on an electronic device, according to one embodiment.

FIG. 4 graphically depicts a method 450 for setting at least one of a voltage and a current level on an electronic device, according to one embodiment. In operation 452, instructions are received by an RFID device via an air interface from an external device such as an RFD reader. The instructions are to set one of at least three different voltage or current levels on an electronic device. In response to the instructions, an electrical signal is output to the electronic device in operation 454 for setting the voltage or current level on the electronic device.

Figure 5:
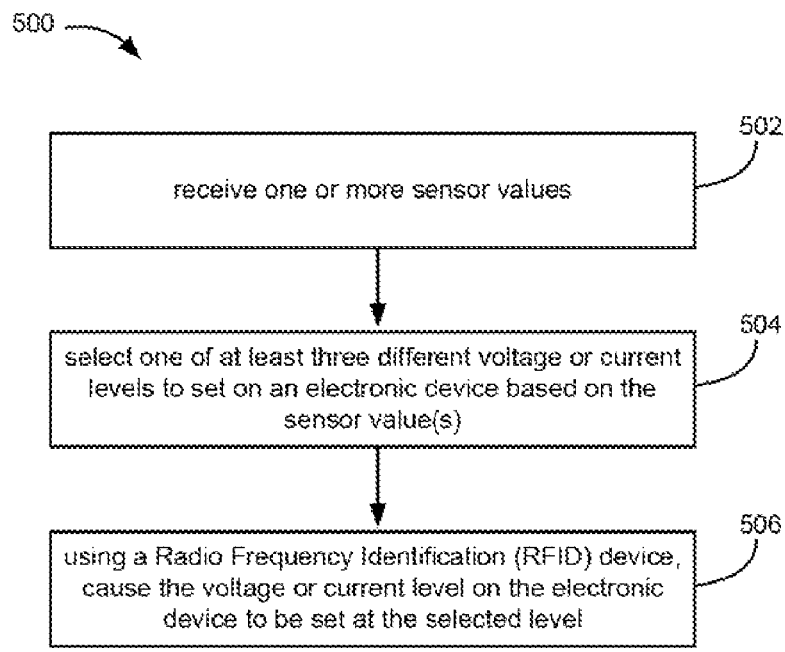
FIG. 5 a process diagram depicting a method for setting at least one of a voltage and a current level on an electronic device based on one or more sensor readings.

FIG. 5 graphically depicts a method 500 for setting at least one of a voltage and a current level on an electronic device based on one or more sensor readings. In operation 502, one or more sensor values are received by an RFID device, an RFID reader, or other device. The sensor value(s) may be the raw output of one or more sensor, a value derived from the raw output, etc.

The sensor itself may be on the RFID device. The sensor may also be remote therefrom, e.g., on another RFID device, coupled to the RFID reader (as the sensor 207 shown in FIG. 1), etc. Further, values from on-board and remote sensors may be used.

The sensor may be any type of sensor. Illustrative sensors include temperature sensors, motion sensors, light sensors, chemical sensors (e.g., oxygen sensor), etc.

With continued reference to FIG. 5, in operation 504, one of at least three different voltage or current levels is selected to set on an electronic device based on the one or more sensor values. This operation may be performed by an RFID device, an RFID reader, or other device. In operation 506, the RFID device is used to cause the voltage or current level on the electronic device to be set at or changed to the selected level.

In one approach, a reader receives the sensor value (from the sensor, from the RFID device, etc.) and selects a level setting based thereon. The reader then sends instructions to the RFID device for causing the voltage or current level on the electronic device to be set at the selected level.

In another approach, the level set on the electronic device is based at least in part on a historical plurality of readings from the sensor. For example, sensor readings may be accumulated over time, and statistical data may be used in the determination of the voltage or current level setting. For example, in an embodiment having a thermal sensor and an LED, the light may slowly change color or intensity to indicate an amount of time that the ambient temperature has been above or below a certain threshold.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   an electronic device; and
   a Radio Frequency Identification (RFID) device in direct electrical communication with the electronic device for selectively setting a voltage or current on the electronic device to one of at least three different levels.

2. The system as recited in claim 1, wherein an analog signal is used to communicate the level setting from the RFID device to the electronic device.

3. The system as recited in claim 1, wherein pulse width modulation is used to communicate the level setting from the RFID device to the electronic device.

4. The system as recited in claim 1, wherein the voltage or current level controls an operation of the electronic device.

5. The system as recited in claim 1, wherein the RFID device receives instructions from an RFID reader to set the voltage or current level on the electronic device, the RFID device setting or changing the voltage or current level on the electronic device in response to the instructions.

6. The system as recited in claim 1, wherein the electronic device emits at least one of an audible and a visual output, wherein a state of the at least one audible and visual output is determined by the voltage or current level set on the electronic device.

7. The system as recited in claim 1, wherein the electronic device includes or controls an electric motor, wherein a state of the electric motor is determined by the voltage or current level set on the electronic device.

8. The system as recited in claim 1, wherein the level set on the electronic device is based at least in part on one or more sensor readings.

9. The system as recited in claim 1, wherein a signal from the RFID device to the electronic device for selectively setting the voltage or current on the electronic device persists beyond a duration of an RF instruction to the RFID device.

10. The system as recited in claim 1, wherein the RFID device is able to set the level on the electronic device in the absence of RF energy sufficient to power the RFID device.

11. A Radio Frequency Identification (RFID) device, comprising:
    an antenna;
    a processor in communication with the antenna; and an interface in communication with the processor, the interface being adapted for direct electrical communication with an electronic device for selectively setting a voltage or current on the electronic device to one of at least three different levels.

12. The device as recited in claim 11, wherein an analog signal is used to communicate the level setting from the RFID device to the electronic device.

13. The device as recited in claim 11, wherein pulse width modulation or frequency modulation is used to communicate the level setting from the RFID device to the electronic device.

14. The device as recited in claim 11, wherein the voltage or current level controls an operation of the electronic device.

15. The device as recited in claim 11, wherein the processor receives instructions from an RFID reader to set the voltage or current level on the electronic device, the processor sending a signal to the electronic device via the interface in response to the instructions.

16. The device as recited in claim 11, wherein the level set on the electronic device is based at least in part on a sensor reading.

17. The device as recited in claim 11, wherein a signal is used to communicate the setting from the RFID device to the electronic device, wherein the signal used to communicate the setting from the RFID device to the electronic device persists beyond a duration of an RF instruction that instructs the RFID device to send the signal, wherein the signal is operative to set the voltage or current on the electronic device.

18. The device as recited in claim 11, wherein a signal is used to communicate the setting from the RFID device to the electronic device, wherein the signal persists in the absence of RF energy sufficient to power the processor.

19. A method for setting at least one of a voltage and a current level on an electronic device, comprising:
receiving, via an air interface, instructions to set one of at least three different voltage or current levels on an electronic device;
in response to the instructions, outputting an electrical signal to the electronic device for setting the voltage or current level on the electronic device.

20. The method as recited in claim 19, wherein the signal is an analog signal for communicating the level setting from an RFID device to the electronic device.

21. The method as recited in claim 19, wherein the signal includes pulse width modulation or frequency modulation for communicating the level setting from an RFID device to the electronic device.

22. The method as recited in claim 19, wherein the electronic device emits at least one of an audible and a visual output, wherein a state of the at least one audible and visual output is determined by the voltage or current level set on the electronic device.

23. The method as recited in claim 19, wherein the electronic device includes or controls an electric motor, wherein a state of the electric motor is determined by the voltage or current level set on the electronic device.

24. The method as recited in claim 19, wherein the level set on the electronic device is based at least in part on one or more sensor readings.

25. The method as recited in claim 19, wherein the signal output to the electronic device persists beyond a duration of an RF instruction that instructs an RFID device to send the signal, wherein the signal is operative to set the voltage or current on the electronic device.

26. The method as recited in claim 19, wherein the signal persists in the absence of RF energy sufficient to power a processor.

27. A method for setting at least one of a voltage and a current level on an electronic device based on one or more sensor readings, comprising:
receiving one or more sensor values;
selecting one of at least three different voltage or current levels to set on an electronic device based on the one or more sensor values;
using a Radio Frequency Identification (RFID) device, causing the voltage or current level on the electronic device to be set at the selected level.

28. The method as recited in claim 27, wherein the one or more sensor values are derived from a sensor on the RFID device.

29. The method as recited in claim 27, wherein the one or more sensor values are derived from a sensor remote from the RFID device.

30. The method as recited in claim 27, wherein the one or more sensor values are derived from multiple sensors.

31. The method as recited in claim 27, wherein a reader receives the one or more sensor values and selects the level based thereon, the reader sending instructions to the RFID device for causing the voltage or current level on the electronic device to be set at or changed to the selected level.

32. The method as recited in claim 27, wherein the level set on the electronic device is based at least in part on a historical plurality of readings from a sensor.

33. The method as recited in claim 27, wherein a signal is used to communicate the setting from the RFID device to the electronic device, wherein the signal persists beyond a duration of an RF instruction that instructs the RFID device to send the signal, wherein the signal is operative to set the voltage or current level on the electronic device.

34. The method as recited in claim 27, wherein a signal is used to communicate the setting from the RFID device to the electronic device, wherein the signal persists in the absence of RF energy sufficient to power a processor.

* * * * *

UNITED STATES PATENT AND TRADEMARK OFFICE
CERTIFICATE OF CORRECTION

| | | |
|---|---|---|
| PATENT NO. | : 8,068,012 B2 | Page 1 of 1 |
| APPLICATION NO. | : 12/350744 | |
| DATED | : November 29, 2011 | |
| INVENTOR(S) | : Peter Arnold Mehring | |

It is certified that error appears in the above-identified patent and that said Letters Patent is hereby corrected as shown below:

col. 7, line 43 replace "RFD" with --RFID--.

Signed and Sealed this
Twenty-eighth Day of February, 2012

David J. Kappos
*Director of the United States Patent and Trademark Office*